US006859721B1

(12) United States Patent
Runquist et al.

(10) Patent No.: US 6,859,721 B1
(45) Date of Patent: Feb. 22, 2005

(54) SYSTEM, DEVICE AND METHOD FOR PROVIDING PROXIMATE ADDRESSES

(75) Inventors: Shane R. Runquist, Austin, TX (US); Stephen C. Robinson, Olathe, KS (US); Thomas H. Walters, Gardner, KS (US); Mark D. Tompkins, Overland Park, KS (US)

(73) Assignee: Garmin Ltd. (KY)

( * ) Notice: Subject to any disclaimer, the term of this patent is extended or adjusted under 35 U.S.C. 154(b) by 198 days.

(21) Appl. No.: 10/027,270

(22) Filed: Dec. 21, 2001

(51) Int. Cl.[7] .............................. G01C 21/30; G01S 5/02
(52) U.S. Cl. ..................... 701/200; 701/201; 701/209; 701/211; 342/357.09; 342/357.06
(58) Field of Search ............................... 701/200, 201, 701/24, 25, 204, 205, 209, 202, 210, 207, 206; 340/991, 993, 995, 998; 342/357.09, 357.1, 357.06

(56) References Cited

U.S. PATENT DOCUMENTS

| | | | | |
|---|---|---|---|---|
| 5,528,248 | A | 6/1996 | Steiner et al. | 342/357 |
| 5,938,721 | A | 8/1999 | Dussell et al. | 701/211 |
| 6,035,299 | A | 3/2000 | White et al. | 707/101 |
| 6,107,944 | A | * 8/2000 | Behr et al. | 340/995.12 |
| 6,112,153 | A | 8/2000 | Schaaf et al. | 701/200 |
| 6,266,612 | B1 | 7/2001 | Dussell et al. | 701/207 |
| 6,317,684 | B1 | * 11/2001 | Roeseler et al. | 701/202 |
| 6,317,687 | B1 | 11/2001 | Morimoto et al. | 701/211 |
| 6,321,158 | B1 | * 11/2001 | DeLorme et al. | 701/201 |
| 6,411,899 | B2 | 6/2002 | Dussell et al. | 701/211 |
| 6,449,535 | B1 | * 9/2002 | Obradovich et al. | 701/1 |

OTHER PUBLICATIONS

"An optimal pathfinder for vehicles in real–world digital terrain maps", http://www.nease.net/jamsoft/shortestpath/pathfinder/4.html, 11 pages, (1999).

"Informed Search Methods", *Artificial Intelligence, A Modern Approach*, Prentice Hall, Inc., pp. 92–115, (1995).

"Real–Time Vehicle Routing in Dynamic and Stochastic Urban Traffic Networks", http://www.gpu.srv.ualberta.ca/lfu/research.htm, pp. 1–3, (1997).

Ahuja, R., et al., "Faster Algorithms for the Shortest Path Problem", *Journal of the Association for Computing Machinery, 37* (2), pp. 213–223, (1990).

Cung, V., et al., "An Efficient Implementation of Parallel A *", *CFPAR*, Montreal, Canada, pp. 153–167, (1994).

Fredman, M., et al., "Fibonacci heaps and their uses in improved network optimization algorithms", *Journal of the ACM, 34* (3), 2 pages, (1987).

Fu, L., "Heuristic Shortest Path Algorithms and their Potential IVHS Applications", *Proceedings of the Fourth University of Alberta—University of Calgary, Joint Graduate Student Symposium in Transportation Engineering*, pp. 83–109, (1995).

(List continued on next page.)

*Primary Examiner*—Thomas G. Black
*Assistant Examiner*—Arthur D Donnelly
(74) *Attorney, Agent, or Firm*—Devon A. Rolf

(57) ABSTRACT

Systems, devices and methods are provided to display or otherwise provide addresses in proximity to the device, and to periodically update the addresses as the navigational aid device is transported along a road. The device is adapted to be transported on a road. The device includes a processor and a memory adapted to communicate with the processor. The processor and the memory are adapted to cooperate to provide an address that is proximate to the device. Another aspect includes a method. According to one method embodiment, an address proximate to a navigational aid device is estimated and displayed on the navigational aid device. Other aspects are provided herein.

37 Claims, 10 Drawing Sheets

OTHER PUBLICATIONS

Ikeda, T., et al., "A Fast Algorithm for Finding Better Routes by AI Search Techniques", *Vehicle Navigation and Information Systems Conference Proceedings*, pp. 291–296, (1994).

Kaindl, H., et al., "Memory–Bounded Bidirectional Search", *Proceedings of the 12th National Conference on Art*, AAAI Press, Seattle, WA, pp. 1359–1364, (1994).

Laporte, G., "The Vehicle Routing Problem: An overview of exact and approximate algorithms", *European Journal of Operational Research, 59*, pp. 345–358, (1992).

Myers, B., "Data Structures for Best–First Search", http://www4.ncsu.edu/jbmyers/dsai.htm, pp. 1–6, (1997).

Ronngren, R., et al., "Parallel and Sequential Priority Queue Algorithms", *ACM Transactions on Modeling and Computer Simulation, 7* (2), pp. 168–172, 198, 199, (1997).

Stout, B., "Smart Moves: Intelligent Pathfinding", *Gamasutra*, http://www.gamasutra.com/features/programming/080197/pathfinding.htm, pp. 1–11, (1997).

Wai, L., et al., "Comparative Study of Shortest Path Algorithm for Transport Network", *USRP Report 2*, http://www.comp.nus.edu.sg/leonghoe/USRPreport–txt.html, pp. 1–10, (1999).

Zhan, F.B., "Three Fastest Shortest Path Algorithms on Real Road Networks: Data Structures and Procedures", *Journal of Geographic Information and Decision Analaysis, 1(1)*, http://www.geog.uwo.ca/gimda/journal/vol1.1/Zhan/Zhan.htm, 11 pages, (1997).

Zhao, Y., et al., "An Adaptive Route–Guidance Algorithm for Intelligent Vehicle Highway Systems", *American Control Conference, Boston, MA*, Department of Electrical Engineering and Computer Science, The University of Michigan, pp. 2568–2573, (1991).

* cited by examiner

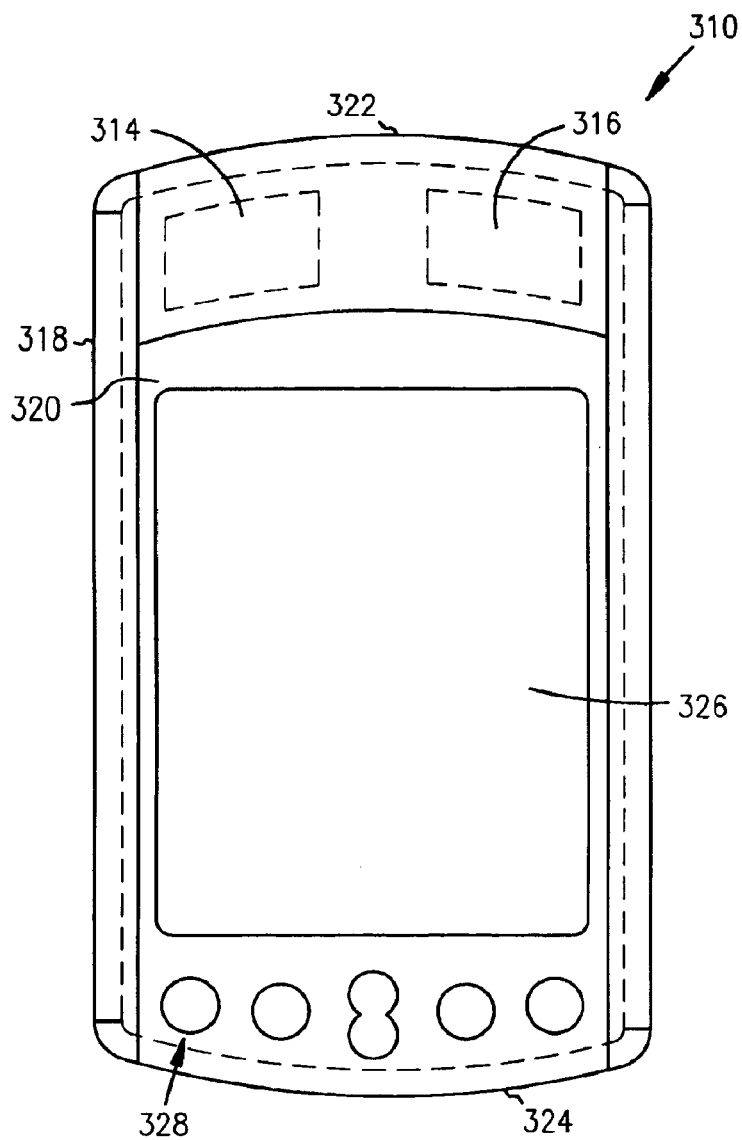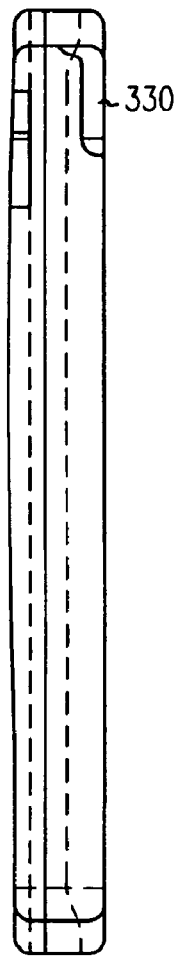
FIG. 3A  FIG. 3B
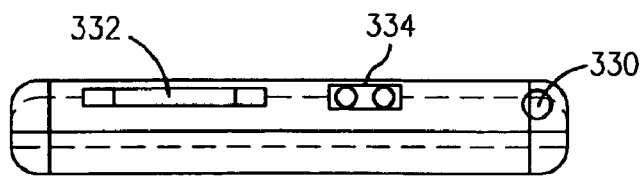
FIG. 3C

SYSTEM, DEVICE AND METHOD FOR PROVIDING PROXIMATE ADDRESSES

FIELD OF THE INVENTION

The present invention relates generally to navigational devices, and in particular to navigational devices that provide addresses in proximity to the device as the unit is transported.

BACKGROUND OF THE INVENTION

Route planning devices are well known in the field of navigational instruments. The capabilities of known route planning devices and methods depend on system resources, such as processor speed and the amount and speed of memory. The processes implemented by a navigational aid device are a function of overall system cost because an increase in system capability also increases system cost. The known art includes a spectrum of products in which the degree of accuracy and the amount and quality of information is dictated primarily by the cost of the system. The lower cost systems currently offer a lower degree of accuracy that often is inadequate for most users, and offer an amount and quality of information that is less than desired for most users.

Processes inherently affected by the limited system resources include route planning, route guidance and other guidance or information provided to assist a user of the device. Route planning involves calculating a route between a starting position and an ending destination. Route guidance guides a user through the appropriate maneuvers to navigate through a planned route. The system requirements for both route planning and route guidance are considerable as these processes involve algorithms or operating instructions acting on a large amount of cartographic data. As such, given the limited system resources and the requirements of route planning and route guidance, other guidance or assistance for the user of the navigational aid device often is not provided with the device.

Route planning and route guidance are useful features in a navigational device. However, other guidance or information is often desirable for a number of reasons. For example, a user may be a local person who knows how to travel to the general location of the ending destination. As such, the user neither needs nor desires to plan a route to the general location of the ending destination. Another example involves a user who has been guided along a planned route, and now is located in the general destination.

Often, these users are traveling to a particular business or residential address for the purpose of an appointment, a delivery, or a social event, for example. The users are somewhat familiar with the area, but are unsure of the location of the building for the desired building or residential address.

These addresses are not easily identified from the road for a number of reasons. For example, the address signs may be inconsistently placed on buildings. Additionally, address signs often are inconsistent in size, and contain inconsistent lettering size and type. Furthermore, the address signs may not be illuminated in the dark. Other reasons involve the distance from the road to the address signs, and the traffic flow speed such that sufficient time for finding address signs is not available. As there may be other reasons why addresses are not easily identified from the road, these examples are not intended as an exhaustive list.

Therefore, there exists a need for a navigational aid device that provides an address that is proximate to the device, and that updates the address as the navigational aid device is transported.

SUMMARY OF THE INVENTION

The above mentioned problems of navigational devices are addressed by the present invention and will be understood by reading and studying the following specification. Systems, devices and methods are provided to display or otherwise provide addresses in proximity to the device, and to periodically update the addresses as the navigational aid device is transported along a road. Thus, the navigational aid device is adapted to indicate addresses passed by a user while driving along a road.

One aspect of the present invention provides an electronic navigational device. The device is adapted to be transported on a road. For example, a user may travel with the device along the road in an automobile. The device includes a processor and a memory adapted to communicate with the processor. The processor and the memory are adapted to cooperate to provide an address that is proximate to the device.

One aspect of the present invention provides a method. According to one method embodiment, an address proximate to a navigational aid device is estimated or otherwise determined, and displayed on the navigational aid device.

Other aspects are provided herein. These, as well as other novel aspects, embodiments, advantages, details, and features of the present invention will be apparent to those skilled in the art from the following detailed description of the invention, the attached claims and accompanying drawings, listed herein below, which are useful in explaining the invention.

BRIEF DESCRIPTION OF THE DRAWINGS

FIGS. 3A–3C illustrate views for another embodiment of an electronic navigational device;

DETAILED DESCRIPTION OF THE INVENTION

A better understanding of the present invention reference may be had to the following detailed description taken in conjunction with dependant claims and accompanied drawings. In essence, the present invention allows an electronic navigational aid device to provide addresses in proximity to the device as the navigational aid device is transported on a road.

Figure 1:
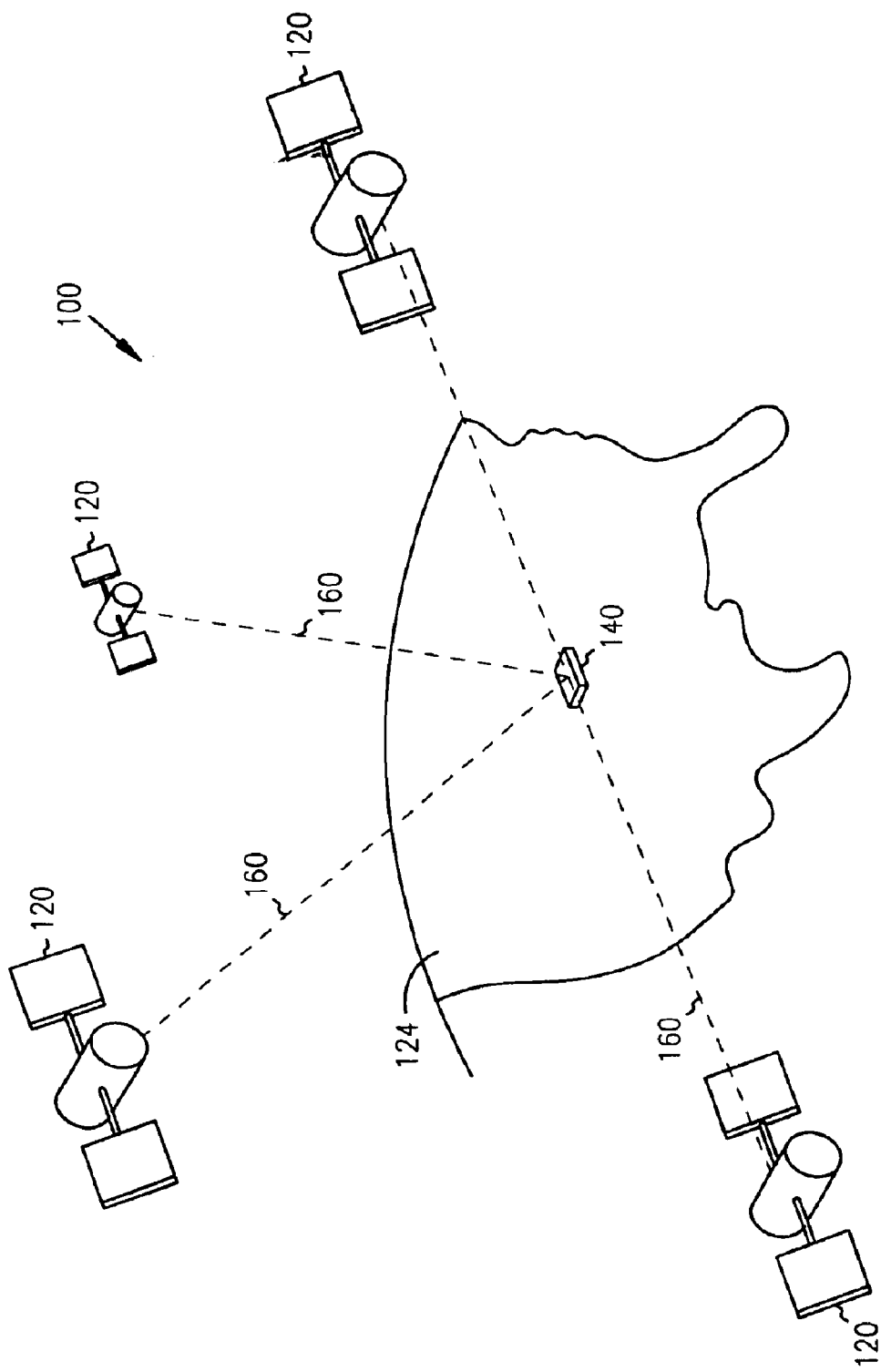
FIG. 1 is representative of a GPS system.

FIG. 1 is representative of a global positioning system (GPS). The GPS 100 includes a plurality of satellites 120 and a GPS receiver device 140. The plurality of satellites 120 are in orbit about the Earth 124. The orbit of each satellite 120 is not necessarily synchronous with the orbits of other satellites 120 and, in fact, is likely asynchronous. The GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

GPS satellites and GPS receiving devices are not required by the tenets of the present invention. Any receiving device capable of receiving the location from at least three transmitting locations is capable of performing basic triangulation calculations to determine the relative position of the receiving device with respect to the transmitting locations.

For example, at least three cellular towers can each transmit their location information to a receiving cellular phone, or any other receiving device, and if the phones or devices are equipped to perform the triangulation algorithm, then the location of the cellular phone or device can be readily resolved. By further way of example, an amusement park or entertainment facility can deploy three or more transmitting radio frequency devices and provide users with receiving units capable of performing a triangulation algorithm to determine the receiving units location within the amusement park or entertainment facility. In this way, it is readily apparent that a receiving unit need not be exclusively GPS enabled to benefit from the teachings of the present invention.

Figure 2A:
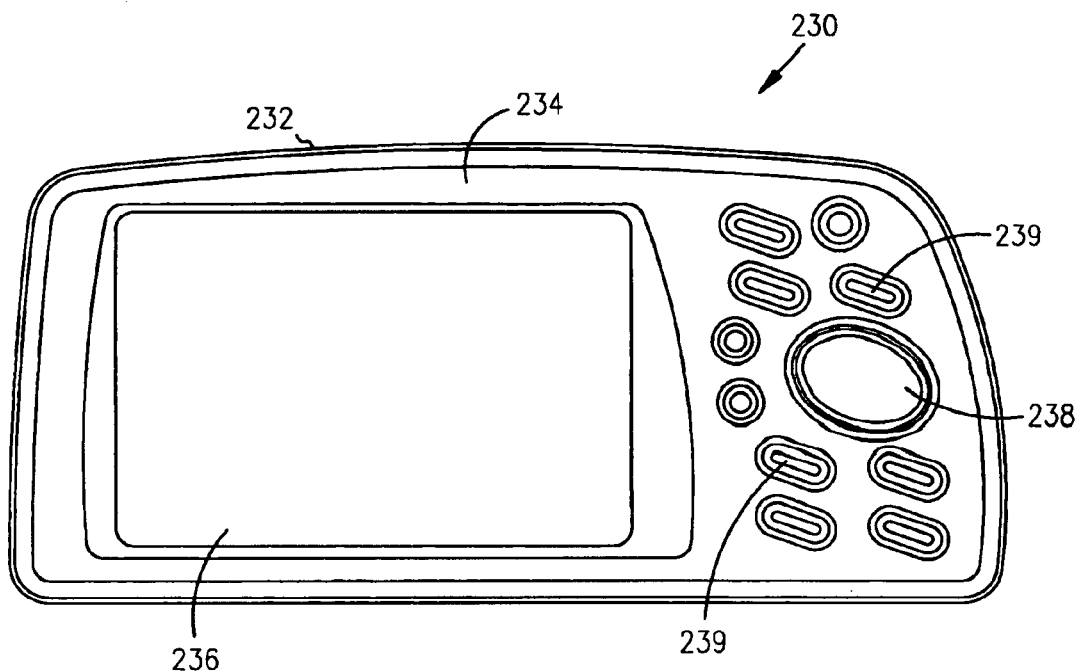
FIGS. 2A and 2B illustrate views for one embodiment of an electronic navigational device.
Figure 2B:
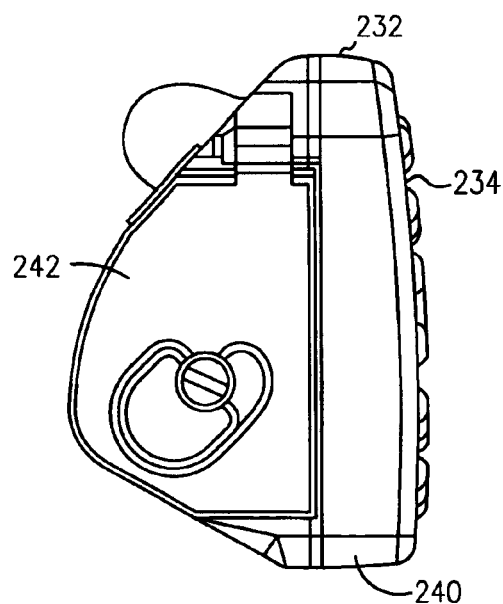

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of separate molded pieces to form the device housing 232 and support input key pad 238, other individual keys 239, and display screen 236 in respective access slots shown in the control face 234 of FIG. 2A.

FIGS. 3A–3C illustrate views for another embodiment of an electronic navigational device 310 according to the teachings of the present invention. The navigational device 310 shown in FIGS. 3A–3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A–3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A–2B and 3A–3C are provided as illustrative examples of hardware components for a navigational device according to the teachings of the present invention. However, the invention is not limited to the configuration shown in FIGS. 2A–2B and 3A–3C. One of ordinary skill in the art will appreciate other suitable designs for a hardware device which can accommodate the present invention.

Figure 4A:
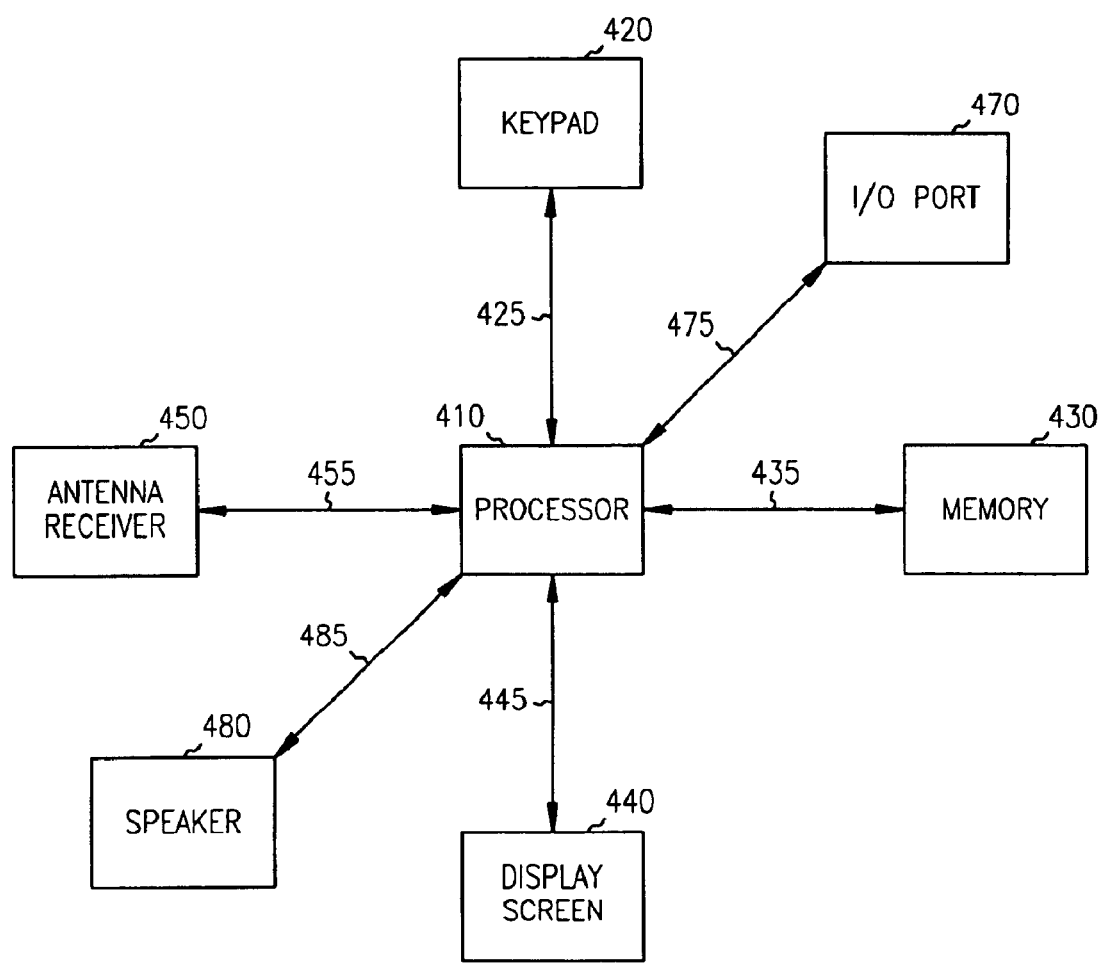
FIG. 4A is a block diagram of one embodiment for the electronic components within the hardware of FIGS. 2A–2B.

FIG. 4A is a block diagram of one embodiment for the electronic components within the hardware of FIGS. 2A–2B, such as within housing 332 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475. According to one embodiment, a speaker 480 is connected to the processor 410 via line 485, and the device is adapted to provide the voice guidance through the speaker 480. According to one embodiment, the device is adapted to be connected to an auxiliary speaker, such as a speaker from a car stereo, earphones or an earpiece, and is adapted to provide the voice guidance through the auxiliary speaker.

Figure 4B:
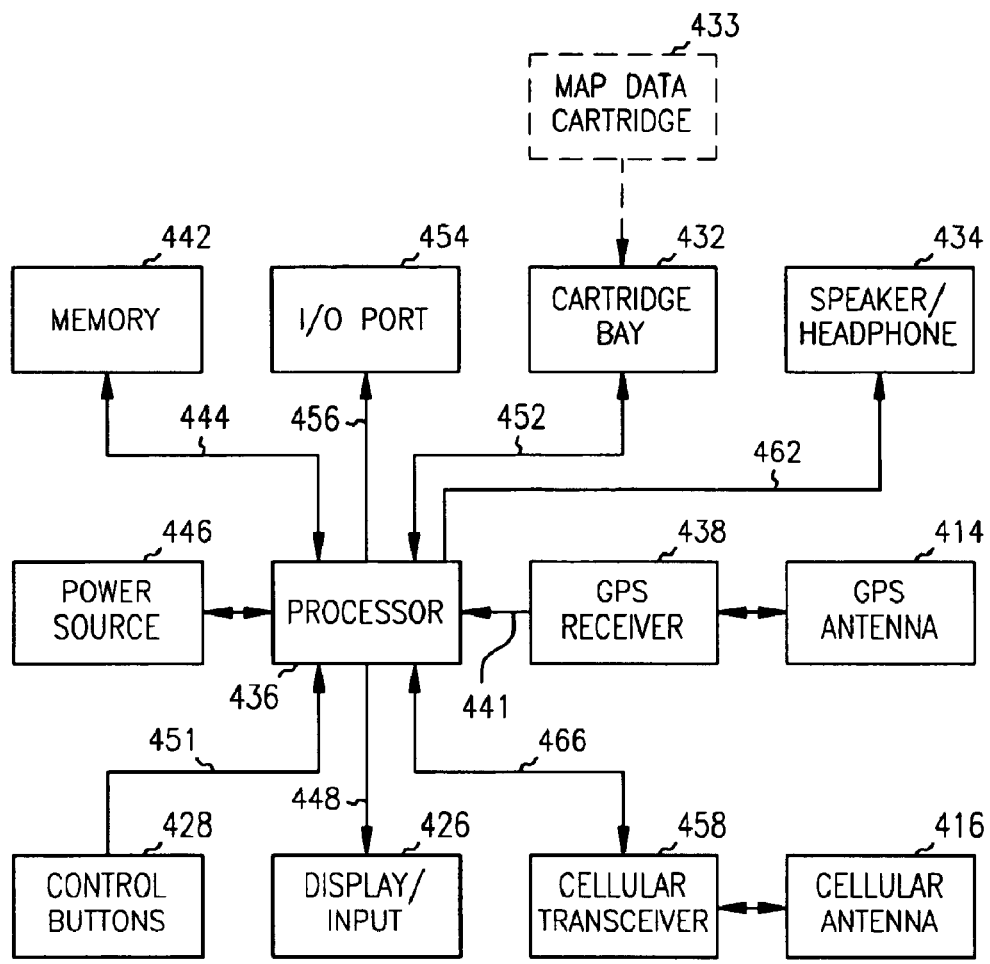
FIG. 4B is a block diagram of one embodiment for the electronic components within the hardware of FIGS. 3A–3C.

FIG. 4B is a block diagram of one embodiment for the electronic components within the hardware of FIGS. 3A–3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

According to the teachings of the present invention, the electronic components embodied in FIGS. 4A and 4B are adapted to provide an address that is proximate to the device. That is, according to the teachings of the present invention, a processor 410 is provided with the electronic navigational aid device, and a memory 430 is connected to the processor 410. As will be discussed in more detail immediately below and with respect to FIGS. 6–11, the processor 410 and memory 430 cooperate to perform various processes according to the teachings of the present invention.

According to one embodiment, the processor 410 and memory 430 cooperate to estimate an address proximate to the navigational device, and display the address on the navigational device. The memory 430 includes cartographic data, and algorithms for estimating and displaying the address.

According to one embodiment, the algorithms are used to access or extract road data. A road data storage element is selected from the road data based on a position of the navigational aid device. Address number ranges associated with the road data storage element are accessed or extracted. An address number range is selected from the extracted address number ranges. An address number is estimated from the address number range, and displayed on the display screen 440 of the navigational aid device.

According to other embodiments, the algorithms determine a direction of travel for the navigational aid device, and estimates a proximate address along a driving side of the road according to local rules. For example, traffic drives on the right side of the road in the United States and on the left side of the road in the United Kingdom. As such, the navigational aid device displays addresses on the right side of the road in the United States and on the left side of the road in the United Kingdom. According to other embodiments, the algorithms display only the odd addresses, only the even addresses, or both the odd and even addresses. These embodiments allow a user to look for addresses on either side of the road, or more generally in other address ranges.

The navigational device includes a display 440 that is adapted to communicate with the processor 410 and is capable of showing addresses that are proximate to the navigational device. According to one embodiment, the display 440 shows both the address number and the road name. According to various embodiments, the display 440 shows the address according to local address formats.

Figure 5:
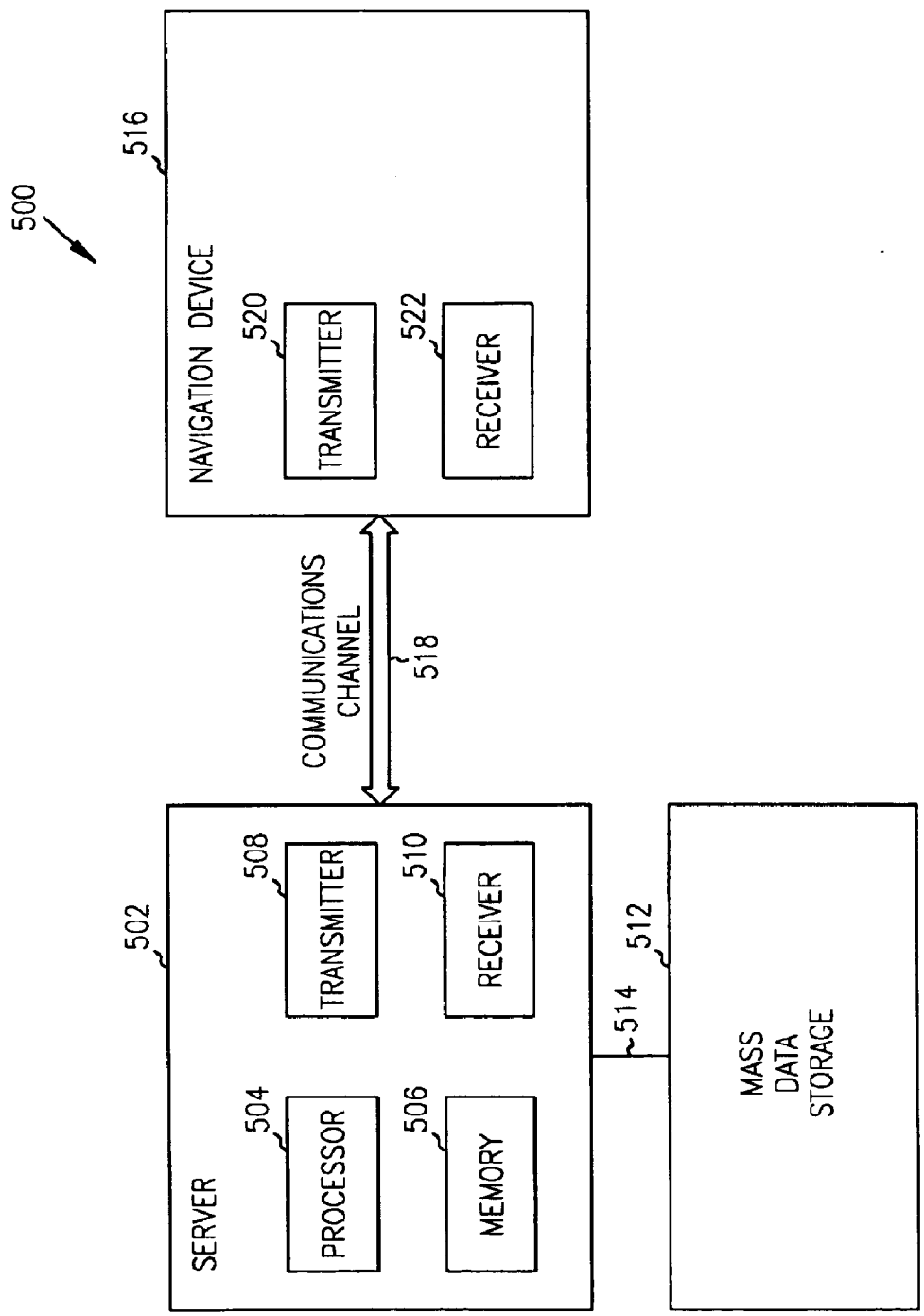
FIG. 5 is a block diagram of a navigation system.

FIG. 5 is a block diagram of an embodiment of a navigation system. The navigation system 500 includes a server 502. According to one embodiment, the server 502 includes a processor 504 operably coupled to memory 506, and further includes a transmitter 508 and a receiver 510 to send and receive communication signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be a separate device from the server 502 or can be incorporated into the server 502.

The navigation system further includes a navigational aid device 516 adapted to communicate with the server 502 through the communication channel 518. According to one embodiment, the navigational aid device 516 includes a processor and memory, as previously shown and described with respect to the block diagram of FIG. 4A and FIG. 4B. Furthermore, the navigational aid device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigational aid device 516. One service provided by the server 502 involves processing requests from the navigational aid device 516 and transmitting navigation data from the mass data storage 512 to the navigational aid device 516. According to one embodiment, another service provided by the server 502 includes processing the navigation data using various algorithms for a desired application, and sending the results of these calculations to the navigational aid device 516.

The communication channel 518 is the propagating medium or path that connects the navigational aid device 516 and the server 502. According to one embodiment, both the server 502 and the navigational aid device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory.

According to one embodiment of the navigation system, the 502 server includes a remote server accessed by the navigational aid device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigational aid device. According to one embodiment, the communication channel 518 is a wireless connection between the personal computer and the navigational aid device 516.

As will be discussed in more detail immediately below and with respect to FIGS. 6–11, the system performs various processes according to the teachings of the present invention. According to one embodiment, the mass data storage 512 is adapted to store navigation data. According to various embodiments, the navigation data includes text, images and/or audio. The server 502 communicates with the mass data storage 512, and thus is able to access and/or process the navigation data. The navigational aid device 516 communicates with and retrieves navigation data from the server 502 via a communication channel 518.

The navigational aid device 516 includes a processor and a memory connected to the processor. According to one embodiment, the processor and memory of the navigational aid device 516 are adapted to provide and perform algorithms or instructions to provide an address that is proximate to the device.

According to another embodiment, the processor 504 and memory 506 of the server 502 are adapted to provide and perform the algorithms or instructions to provide or estimate an address that is proximate to the device. The navigational aid device 516 receives this estimated address from the server 502 through the communication channel 518. These, and other embodiments, are discussed in more detail below.

According to one embodiment, the algorithms are used to access or extract road data. A road data storage element is selected from the road data based on a position of the navigational aid device 516. Address number ranges associated with the road data storage element are accessed or extracted. An address number range is selected from the extracted address number ranges. An address number is estimated from the address number range, and displayed on the display screen of the navigational aid device 516. According to other embodiments, the algorithms determine a direction of travel for the navigational aid device, and estimates a proximate address along a driving side of the road according to local rules. According to one embodiment, the display screen shows both the address number and the road name. According to various embodiments, the display screen shows the address according to local address formats.

FIG. 6-11, as described below, provide additional aspect of the invention. One of ordinary skill in the art will understand, upon reading and comprehending this disclosure, how to incorporate these aspects into the device and system described above.

Figure 6:
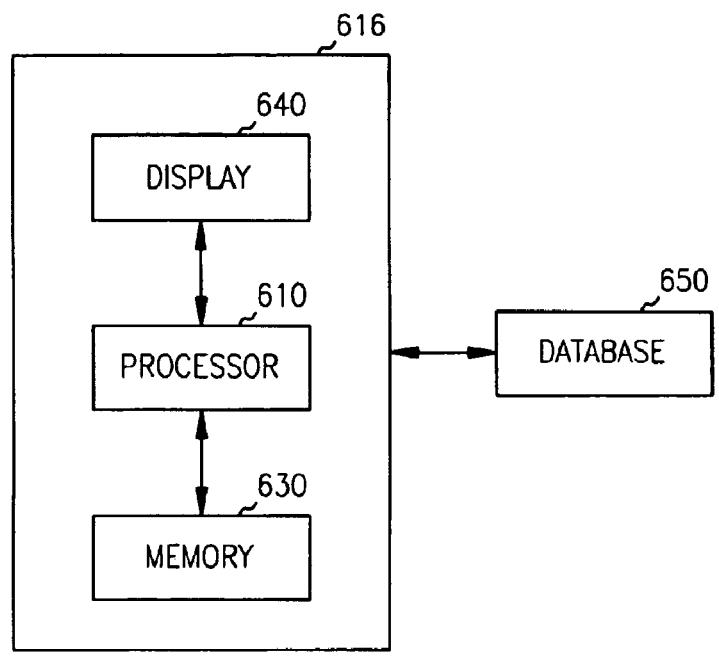
FIG. 6 is a block diagram of the components of the electronic navigational aid device in communication with at least one database that contains road data and address number ranges.

FIG. 6 is a block diagram of the components of the electronic navigational aid device in communication with at least one database that contains road data and address number ranges. According to one embodiment, the navigational aid device shown in FIG. 6 is similar to the navigational aid device shown in FIG. 4A and FIG. 4B, and includes the electronic components shown therein. As shown in FIG. 6, the navigational aid device 616 includes, but is not limited to, a processor 610, a memory 630, and a display 640.

The navigational aid device 616 is in communication with at least one database 630. According to various embodiments, the database 650, or portions thereof, is contained in memory 630 of the navigational aid device 616, in memory 506 of the system 500 as shown in FIG. 5, and/or in a mass data storage 512 as shown in FIG. 5.

The database 650 contains road data. The road data includes individual road elements which represent roads.

The database 650 also contains address number ranges associated with the individual road elements.

A number of methods may be used to store and retrieve cartographic data from the database 650. These methods include, for example, U.S. Pat. No. 5,995,970 ('970) entitled Method and Apparatus for Geographic Coordinate Data Storage, U.S. Pat. No. 6,188,955 ('955) entitled Method and Apparatus for Storing Cartographic Route Data, and U.S. Pat. No. 6,252,605 ('605) entitled System and Method for Packing Spatial Data in an R-Tree. Patents '970, '955 and '605 are all assigned to applicant's assignee, Garmin Corporation. Patents '970, '955 and '605 are incorporated by reference herein.

Figure 7:
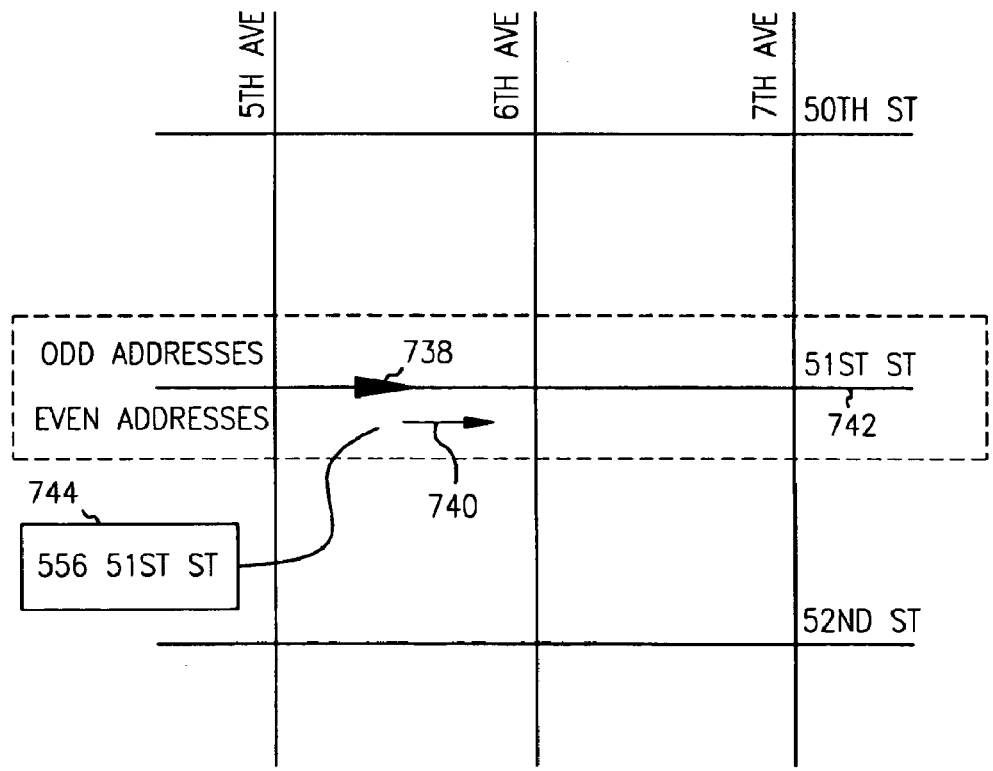
FIG. 7 is a map illustration of city blocks.

FIG. 7 is a map illustration of city blocks. This simple illustration includes 50th Street, 51st Street, and 52nd Street intersected by 5th Avenue, 6th Avenue and 7th Avenue. The navigational aid device is represented by the arrow head 738, and is traveling along the 500 block of 51st Street in the direction of arrow 740. As such, as will be described in more detail with respect to the method shown in FIGS. 10 and 11 below, 51st Street is designated as a best road data element 742.

The navigational aid device 738 is being transported along 51st Street. That is, for example, a vehicle that contains the navigational aid device is traveling along 51st Street. Roads often have odd addresses on one side and even address on the other side. From an orientation in the direction of the arrow in the illustration of FIG. 7, odd addresses are found on the left side of the street and even addresses are found on the right side of the street, for example. These odd and even addresses form address ranges that are associated with the best road data element. These odd and even addresses may be further divided into additional address ranges as appropriate for the road data.

The navigational aid device 738 is adapted to provide an address proximate to the navigational aid device 738. A displayed proximate address in this illustration is 556 51st Street. According to one embodiment, the navigational device determines a direction of travel on the road and estimates an address along a driving side of the road according to local driving rules. For example, the driving side of the road in the United States is the right side of the road, and the driving side of the mad in the United Kingdom is the left side of the road.

According to other embodiments, the navigational aid device 738 is capable of displaying at a user's discretion odd addresses, even addresses, or both odd and even addresses. As such, regardless of the direction of travel on the road, a user is able to select the desired address range displayed on the navigational aid device 738. For example, a user is able to selectively display the odd, the even or both the odd and the even address ranges on the navigational aid device 738.

According to another embodiment, the navigational device displays both the address number and the road name associated with the address that is proximate to the navigational aid device. According to various embodiments, the address number and road name are displayed according to local address formatting rules or conventions.

Figure 8:
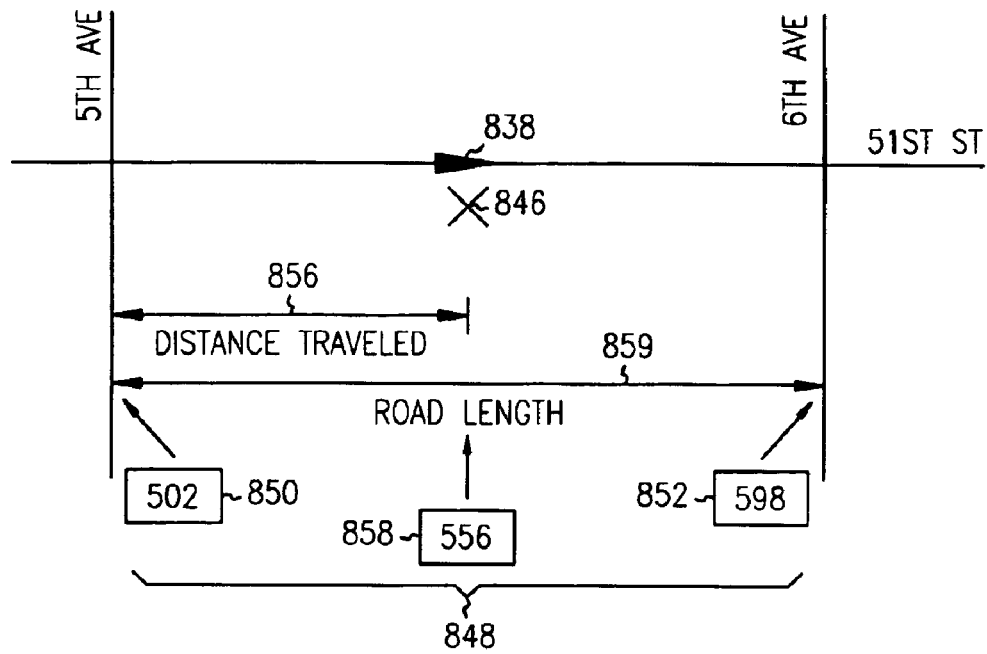
FIG. 8 illustrates one embodiment for estimating an address within an address range.

FIG. 8 illustrates one embodiment for estimating an address within an address range. According to this embodiment, the position 846 of the navigational aid device 838 is determined. In FIG. 8, for example, it is determined that the navigational aid device 838 is traveling on 51st Street. An address range 848 is associated with the position of the navigational aid device 838. In the illustrated example, it is determined that the address number range 848 is from "502" at 850 to "598" at 852. The distance traveled from the beginning of the address number range (502 51st Street) at 850 to the position 846 of the navigational aid device 838 is determined. An address is estimated based on the address number range 848, the length 859 of the road associated with the address range 848, and the distance 856 traveled from the beginning of the address number range 848 at 850 to the position 846 of the navigational aid device 838. An estimated address number 858 is derived based on this information. In the illustrated example, the estimate proximate address 858 along the driving side of the road is estimated to be "556".

Figure 9:
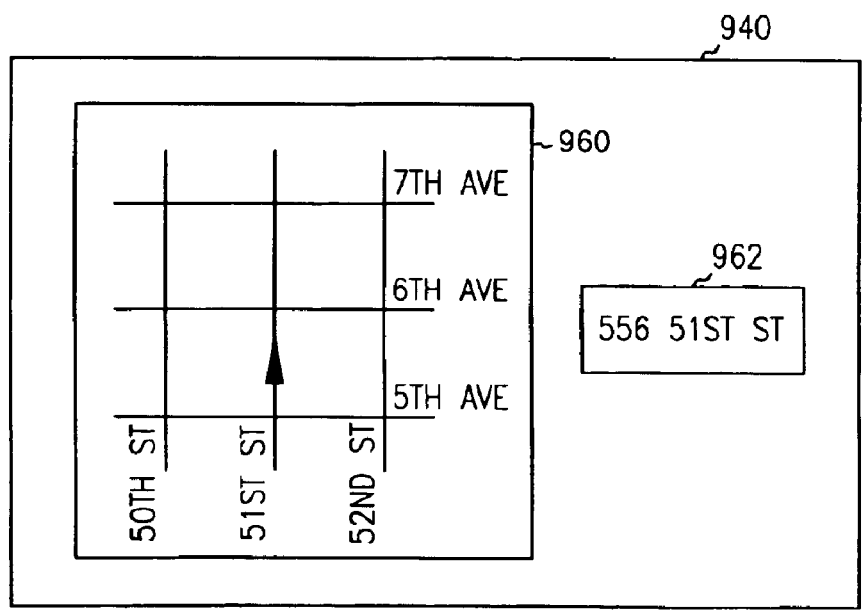
FIG. 9 is one display embodiment for providing an address that is proximate to a navigational aid device.

FIG. 9 is one display embodiment for providing an address that is proximate to a navigational aid device. According to one embodiment, the illustrated display 940 is the display screen 236 of FIG. 2, or the display 440 for the navigational aid device of FIG. 4A, or the display 426 for the navigational aid device of FIG. 4B. According to the illustrated embodiment, the display 940 includes a map window 960 for indicating a position of the navigational aid device as the device is transported along the road. As shown, the map is rotated so that the direction of travel is up; that is, one embodiment of the display 940 is a heads-up display. As one of ordinary skill in the art will understand upon reading and comprehending this disclosure, other displays are available for this window. Additionally, the display 940 includes a proximate address display window 962 for displaying addresses that are proximate to the navigational aid device as the navigational aid device is transported along the road. For example, as the device is transported along 51st Street, the proximate address display window is periodically updated to continue to indicate a proximate address as the navigational aid device is moved.

According to one embodiment, the proximate address display window 962, as well as the position of the navigational device in the map window 960, is periodically updated at approximately one second intervals. According to one embodiment, the periodic update is based on an update event. The position, speed, and direction of the navigational aid device is determined at each update event. Based on this information, a proximate address is displayed in the proximate address display window 962.

Figure 10:
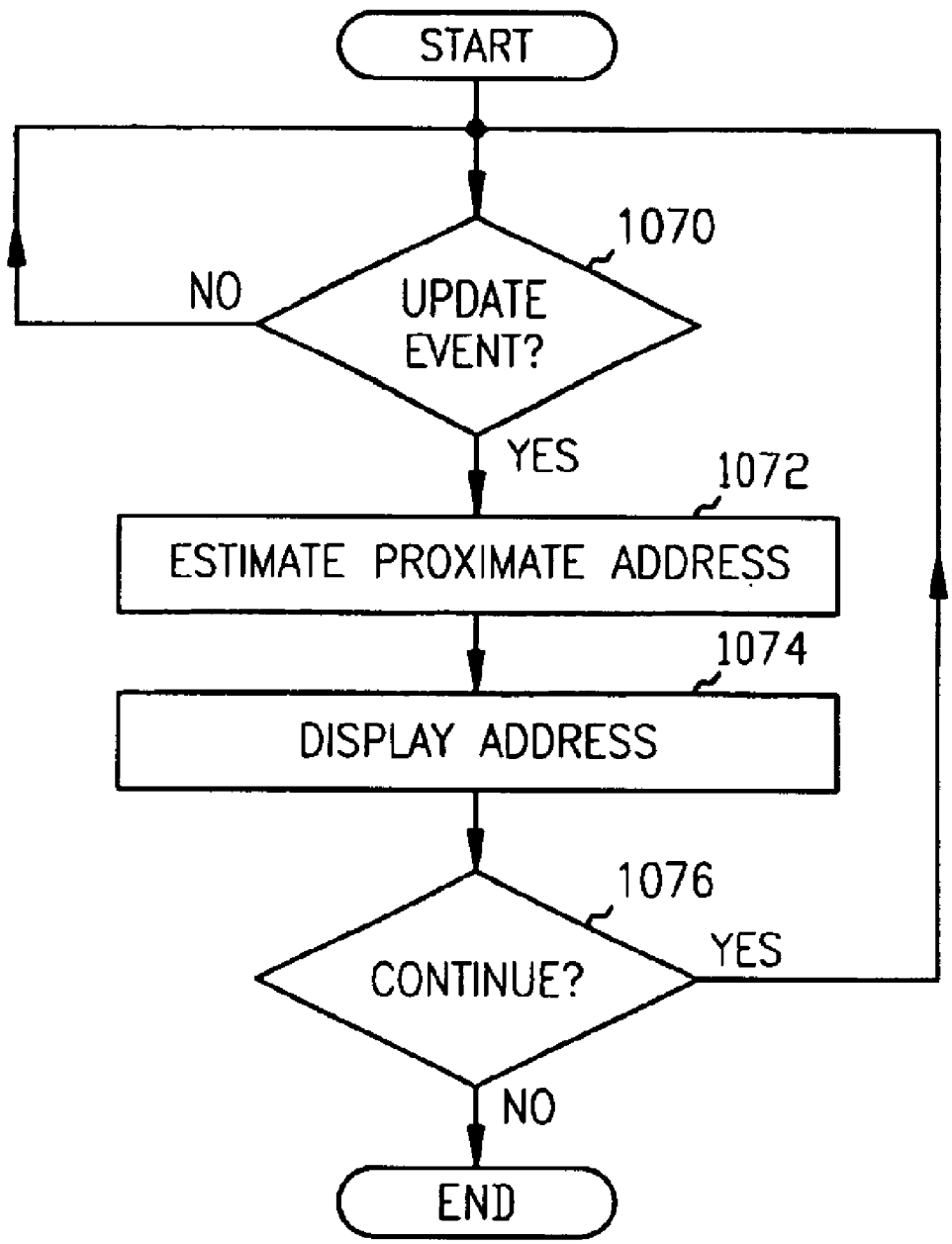
FIG. 10 is a flow diagram of one method embodiment according to the present invention.

FIG. 10 is a flow diagram of one method embodiment according to the present invention. According to this embodiment, it is determined at 1070 if an update event has occurred. According to one embodiment, the update event is a periodic event for calculating or otherwise determining navigational aid device information. According to one embodiment, the update event occurs approximately at one second intervals.

If an update event has not occurred, the process returns to 1070 until such time that an update event does occur. Upon determining that an update event has occurred, the process proceeds to 1072 to estimate an address that is proximate to the navigational aid device. The process continues to 1074 to display, or otherwise provide, the estimated address. According to one embodiment, the estimated address is displayed on the navigational device. At 1076, it is determined whether the process is to continue or repeat. Upon determining that the process is to repeat, the process returns to 1070. Upon determining that the process is not to repeat, the process terminates.

Figure 11:
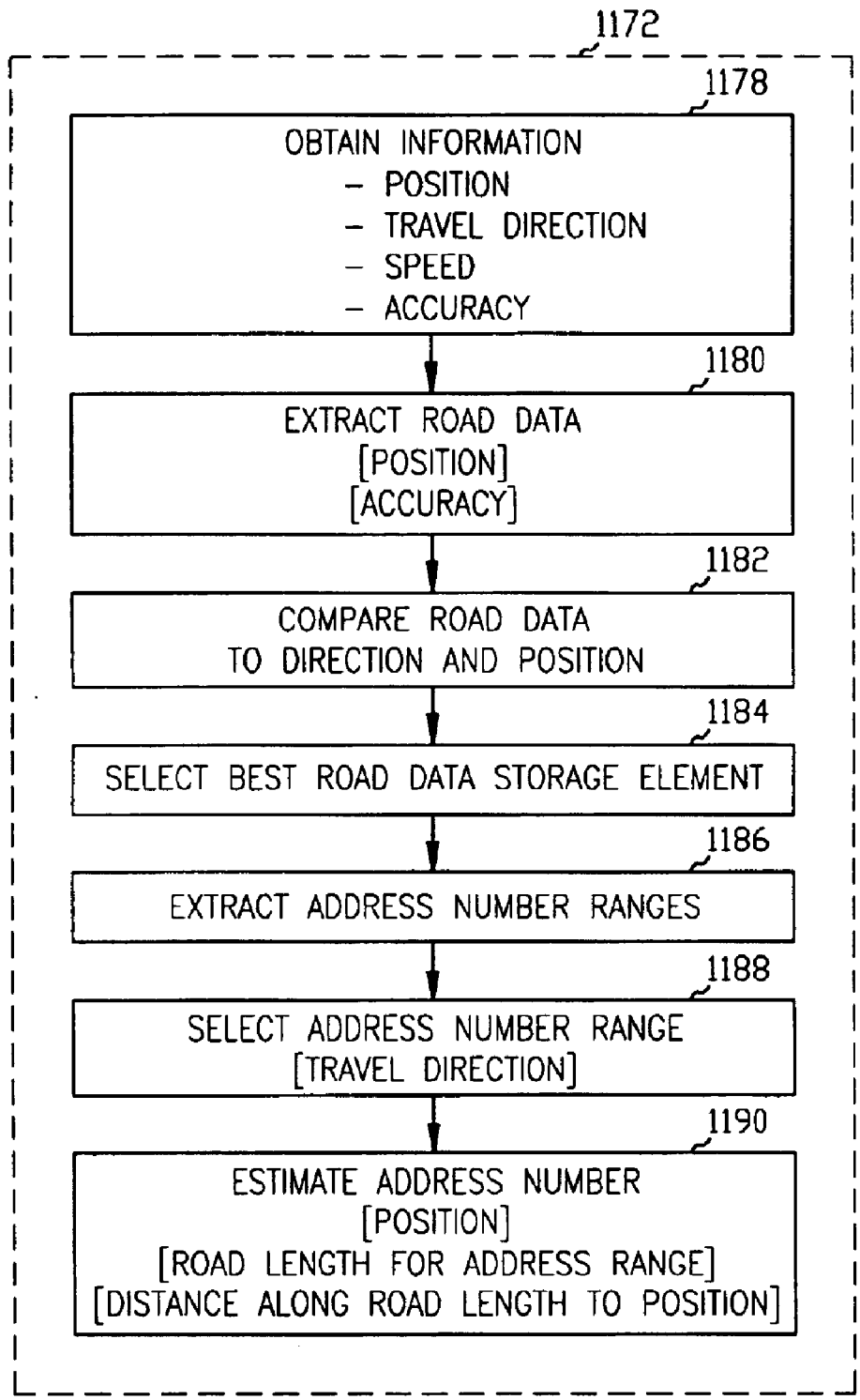
FIG. 11 is a flow diagram of one embodiment for estimating the proximate address as shown in FIG. 10.

FIG. 11 is a flow diagram of one embodiment for estimating the proximate address as shown in FIG. 10. As such, the process performed by FIG. 11 is generally designated by the reference 1172 to correspond to 1072 in FIG. 10.

According to one embodiment, at 1178, information is obtained at the update event. This information includes a position and travel direction of a navigational aid device. This information also includes accuracy information regarding the accuracy or resolution of the cartographic data and the determined position and direction. This information may be characterized as functional data that is processed by various algorithms to provide a proximate road address.

At 1180, road data is extracted from a database. According to one embodiment, the appropriate road data is extracted based on position and accuracy previously determined at 1178. The road data includes a number of road data storage elements, and address ranges associated with the road data storage elements. A comparison is made at 1182 between the road data and the previously determined direction and position of the navigational aid device such that, at 1184, a best road data storage element is able to be selected.

At 1186, address number ranges associated with the best road data storage element are extracted from the database. An address number range is selected at 1188 based on the previously determined travel direction. At 1190, an address number is estimated based on the previously determined position of the navigational aid device, a road length for the selected address range, and a distance from one end of the best road data storage element to the position of the navigational aid device.

One of ordinary skill in the art will understand, upon reading and comprehending this disclosure, that other methods may be implemented to provide an address that is proximate to a navigational aid device. As such, the methods and functional data should be interpreted as a nonexclusive embodiment. The elements of the process, for example, do not necessarily have to occur in the order as shown.

In some embodiments, the methods illustrated in FIGS. 10–11 and the associated functional data are implemented as a computer data signal embodied in a carrier wave, that represents a sequence of instructions which, when executed by a processor, such as processor 410 in FIG. 4A and processor 436 in FIG. 4B, cause the processor to perform the respective method. In other embodiments, these methods and functional data are implemented as a computer-accessible medium, such as memory 430 in FIG. 4A and memory 442 in FIG. 4B, having executable instructions capable of directing a processor, such as processor 410 in FIG. 4A and processor 436 in FIG. 4B, to perform the respective method. In varying embodiments, the medium is a magnetic medium, an electronic medium, or an optical medium.

As one of ordinary skill in the art will understand upon reading this disclosure, the electronic components of device shown in FIGS. 4A and 4B and components of the system 500 shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object, oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to providing addresses in proximity to a navigational aid device. Proximate addresses with respect to the navigational aid device are displayed on the navigational aid device. The displayed addresses are updated as the navigational aid device is transported. Features associated with the device allow a user to select whether to display odd or even addresses. A user is able to quickly and conveniently identify addresses, or estimated addresses, from the road.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. An electronic navigational aid device, comprising:
   a processor, and
   a memory adapted to communicate with the processor,
   wherein the device is adapted to be transported on a road, and
   wherein the processor and the memory are adapted to cooperate to provide an address that is proximate to and representative of a current position of the device and update the address based on the current position of the device as the device is transported on the road such that the address continues to be proximate to and representative of the current position of the device.

2. The device of claim 1, wherein the processor and the memory are adapted to cooperate to estimate the address that is proximate to the navigational device.

3. The device of claim 2, wherein the processor and the memory are adapted to cooperate to determine a direction of travel and to estimate the address that is proximate to the navigational device along a driving side of the road according to local driving rules.

4. The device of claim 2, wherein the processor and the memory are adapted to cooperate to estimate addresses proximate to the navigational device by being adapted to cooperate to:

estimate the current position of the navigational device, estimate a road segment length proximate to an address range associated with the current position of the navigational device, and estimate a distance along the road segment length to the current position of the navigational device.

5. The device of claim 1, wherein the processor and the memory are adapted to extract road data from a database.

6. The device of claim 1, wherein the processor and the memory are adapted to extract address number ranges from a database.

7. The device of claim 1, further comprising a display upon which the address is displayed.

8. The device of claim 7, wherein the displayed address on the display includes an address number and a road name.

9. The device of claim 1, wherein the electronic navigational aid device comprises a portable electronic navigational aid device.

10. The device of claim 9, wherein the portable electronic navigational aid device includes a personal digital assistant (PDA).

11. The device of claim 9, wherein the portable electronic navigational aid device includes a wireless communication device.

12. A navigation system, comprising:

a mass data storage adapted to store navigation data;

a server adapted to communicate with the mass data storage; and a navigational aid device adapted to communicate with and retrieve navigation data from the server via a communication channel, wherein the device is adapted to be transported on a road, wherein the system is adapted to display on the device an address that is proximate to and representative of a current position of the device, and update the address as the device is transported on the road such that the address continues to be proximate to and representative of the current position of the device.

13. The navigation system of claim 12, wherein the communication channel includes a wireless channel.

14. The navigation system of claim 12, wherein the server includes a remote server.

15. The navigation system of claim 12, wherein the server includes a processor adapted to respond to a request from the navigational aid device by performing calculations on the navigation data and transmitting the results to the navigational aid device.

16. The navigation system of claim 12, wherein the navigational aid device is adapted to communicate with and retrieve navigation data from the server using streaming data.

17. The navigation system of claim 12, wherein the navigational aid device is adapted to communicate with and retrieve navigation data from the server using cellular communication technology.

18. The navigation system of claim 12, wherein:

the navigational aid device includes a processor in communication with a memory, and the processor and the memory of the navigational aid device are adapted to cooperate to display the address on the device.

19. The navigation system of claim 12, wherein the system is adapted to cooperate to determine a direction of travel and to estimate the address proximate to the navigational device along a driving side of the road according to local driving rules.

20. The navigation system of claim 12, wherein the processor and the memory are adapted to cooperate to estimate addresses proximate to the navigational device by being adapted to cooperate to:

estimate the current position of the navigational device, estimate a road segment length proximate to an address range associated with the current position of the navigational device, and estimate a distance along the road segment length to the current position of the navigational device.

21. The navigation system of claim 12, further comprising a database, wherein the system is adapted to extract road data and address number ranges from the database.

22. The navigation system of claim 12, wherein the navigational aid device further includes a display upon which the address is displayed.

23. A method, comprising:

estimating an address proximate to and representative of a current position of a navigational aid device and updating the address as the device is transported on the road such that the address continues to be proximate to and representative of the current position of the device; and displaying the address on the navigational aid device.

24. The method of claim 23, wherein estimating an address proximate to a navigational device includes identifying a road upon which the navigational aid device is being transported.

25. The method of claim 24, wherein identifying a road upon which the navigational aid device is being transported includes:

extracting road data based on a position and an accuracy of the navigational aid device; and selecting a best road data element based on a comparison between both the road data and the travel direction and the position.

26. The method of claim 24, wherein estimating an address proximate to and representative of a current position of a navigational aid device further includes determining a range of addresses along the road proximate to the navigational aid device.

27. The method of claim 26, wherein estimating an address proximate to and representative of a current position of a navigational aid device further includes:

estimating an address number based on the current position of the navigational aid device, estimating a road length associated with the range of addresses, and estimating a distance from one end of the road length to the position of the navigational aid device.

28. The method of claim 23, wherein estimating an address proximate to and representative of a current position of a navigational device includes obtaining information regarding a position and a travel direction for the navigational device.

29. The method of claim 28, wherein estimating an address proximate to and representative of a current position of a navigational device further includes obtaining information regarding accuracy of the navigational device and road data.

30. The method of claim 23, wherein estimating an address proximate to and representative of a current position of a navigational device and displaying the address on the navigational device are triggered by periodic update events.

31. A method, comprising:
- accessing road data that is associated with a road upon which a navigational aid device is being transported;
- selecting a road data storage element from the road data based on a current position of the navigational aid device;
- extracting address number ranges associated with the road data storage element;
- selecting an address number range from the extracted address number ranges;
- estimating an address number from the address number range that is proximate to and representative of the current position of the navigational aid device; and
- displaying the estimated address number.

32. The method of claim 31, further comprising periodically displaying an updated estimated address number.

33. The method of claim 31, wherein accessing road data includes extracting road data from a database based on a position and an accuracy of the navigational aid device.

34. The method of claim 31, wherein selecting a road data storage element from the road data includes comparing the road data to a travel direction and a position of the navigational aid device to find a road data storage element having a best match.

35. The method of claim 31, wherein selecting an address number range from the extracted address number ranges is based on a travel direction of the navigational device.

36. The method of claim 31, wherein estimating the address number from the address number range is based on a position of the navigational aid device, a road length for the address range, and a distance along the road length to the position of the navigational aid device.

37. The method of claim 31, wherein displaying the estimated address number includes displaying a street name associated with the address number.

* * * * *